US00RE34064E

United States Patent [19]

Tury et al.

[11] E Patent Number: Re. 34,064

[45] Reissued Date of Patent: Sep. 15, 1992

[54] ELECTRIC SHIFT APPARATUS

[75] Inventors: Edward L. Tury, Brighton; David F. Salzmann, South Lyon; Keith V. Leigh-Monstevens, Rochester Hills; John G. Vander Poorte, St. Clair Shores; David C. Peterson, Walled Lake, all of Mich.

[73] Assignee: Automotive Products (USA) Inc., Auburn Hills, Mich.

[21] Appl. No.: 626,988

[22] Filed: Dec. 13, 1990

Related U.S. Patent Documents

Reissue of:

[64] Patent No.: 4,790,204
Issued: Dec. 13, 1988
Appl. No.: 62,775
Filed: Jun. 16, 1987

[51] Int. Cl.[5] ..... F16H 59/02; G05G 11/00

[52] U.S. Cl. ..... 74/335; 73/866.1; 74/483 PB; 74/866; 192/4 A

[58] Field of Search ..... 74/335, 336 R, 473 R, 74/473 P, 483 PB, 364, 365; 29/401.1; 73/866.1, 117.2, 117.3; 192/4 A

[56] References Cited

U.S. PATENT DOCUMENTS

| | | | |
|---|---|---|---|
| 2,578,142 | 12/1951 | Mayrath | 74/861 X |
| 2,578,158 | 12/1951 | Toot | 74/861 X |
| 2,621,533 | 12/1952 | Schotz | 74/861 X |
| 2,631,701 | 3/1953 | Ainsworth et al. | 74/861 X |
| 2,634,838 | 4/1953 | Price | 74/861 X |
| 2,758,683 | 8/1956 | Randol | 74/861 X |
| 2,902,881 | 9/1959 | Loofbourrow | 74/483 PB X |
| 2,910,885 | 11/1959 | Bevacqua | 74/473 |
| 2,924,124 | 2/1960 | Froslie | 74/483 PB X |
| 3,001,618 | 9/1961 | McCordic et al. | 74/483 PB X |
| 3,106,852 | 10/1963 | Miller | 74/625 X |
| 3,130,596 | 4/1964 | Gorski | 74/850 X |
| 3,335,618 | 8/1967 | Russey | 74/876 |
| 3,448,640 | 6/1969 | Nelson | 74/866 |
| 3,780,597 | 12/1973 | White | 74/483 PB |
| 4,412,828 | 11/1983 | Darby | 74/473 R X |
| 4,564,906 | 1/1986 | Stephan et al. | 74/866 X |
| 4,567,763 | 2/1986 | Schiffbauer | 200/56 R X |
| 4,570,765 | 2/1986 | Makita | 74/335 X |
| 4,583,171 | 4/1986 | Hara et al. | 74/365 X |
| 4,602,528 | 7/1986 | Bailey | 74/861 |
| 4,664,217 | 5/1987 | Welch et al. | 74/337.5 X |

FOREIGN PATENT DOCUMENTS

| | | | |
|---|---|---|---|
| 134646 | 3/1986 | European Pat. Off. . | |
| 59-50260 | 3/1984 | Japan | 74/336 R |
| 60-176829 | 9/1985 | Japan | 74/336 R |
| 863327 | 3/1961 | United Kingdom . | |
| 832007 | 4/1990 | United Kingdom . | |

OTHER PUBLICATIONS

Rolls Royce Manual, 2 pages, Aug. 1977.
SAE Technical Paper 840448, Feb. 27,. 1984.
SAE Technical Paper 831776, Nov. 7, 1983.

*Primary Examiner*—Allan D. Herrmann
*Attorney, Agent, or Firm*—Krass & Young

[57] ABSTRACT

An electric shift apparatus for use with a motor vehicle having an automatic transmission. The apparatus includes a power module adapted to be mounted on the housing of the transmission proximate the transmission mode select lever and the transmission kick-down lever and a control module adapted to be mounted in the passenger compartment of the vehicle. The power module includes an electric motor assembly drivingly connected to the free end of the mode select lever and a solenoid drivingly connected to the free end of the kick-down lever. The control module includes a plurality of push button members corresponding respectively to the transmission shift positions. An encoder device carried by the motor assembly of the power module provides a constant coded signal indicating the instantaneous position of the transmission mode select lever and this coded signal is compared by comparator means in the logic of the control unit with the selected shift position. The comparator means generates a signal to the motor assembly to move the mode select lever in a direction to achieve the selected shift position and stops the motor assembly when the encoder signal received from the power module matches the selected shift position indicating that the selected shift position has been achieved.

26 Claims, 5 Drawing Sheets

ELECTRIC SHIFT APPARATUS

Matter enclosed in heavy brackets [ ] appears in the original patent but forms no part of this reissue specification; matter printed in italics indicates the additions made by reissue.

BACKGROUND OF THE INVENTION

This invention relates to an electric shift apparatus especially suited for use with a motor vehicle having an automatic transmission.

Motor vehicle since their inception have required some manner of gear change mechanism to satisfy the varying torque and speed requirements encountered during the typical duty cycle of a motor vehicle. For many years these gear change mechanisms were manual in the sense that they required an operator input from a shift lever or the like to effect each desired gear change ratio. More recently, so called "automatic" transmissions have become popular in which much of the shifting is done without operator input in response to sensed speed and throttle opening parameters. These automatic transmission typically include a mode select lever positioned on the transmission housing and movable between a plurality of selectively pivoted positions corresponding to a respective plurality of shift modes within the transmission. The mode select lever is pivotally moved between its several shift positions by a cable or linkage mechanism extending from the mode select lever to a suitable gear selector lever located in the passenger commpartment of the vehicle. Various proposals have been made in the past to eliminate the mechanical interconnection between the driver operated lever and the mode select lever and provide instead an electrical signal generated by a suitable action on the part of the driver and transmitted electrically to some manner of power means arranged to move the mode select lever. None of these attempts to provide an electric shift mechanism for an automatic transmission of a motor vehicle have met with any degree of commercial success since they provided a slow or imprecise shifting action and/or have generated excessive warranty and maintenance costs.

SUMMARY OF THE INVENTION

This invention is directed to the provision of an electric shift apparatus for the automatic transmission of a motor vehicle which provides positive and precise shifting, which is amenable to ready installation in the motor vehicle at the time of the original motor vehicle manufacture, and which is reliable in operation even over a long motor vehicle life.

The invention electric shift apparatus is intended for use with a motor vehicle having automatic transmission of the type including a mode select lever and a kick-down lever positioned outside of the transmission housing and mounted for pivotal movement at one end thereof about a common axis.

According to a feature of the invention, the electric shift apparatus includes a power transmission module comprising a bracket adapted to be secured to the transmission housing proximate the levers; first motor means mounted on the bracket and adapted to be drivingly connected to the free end of the mode select lever; and second motor means mounted on the bracket and adapted to be drivingly connected to the free end of the kick-down lever. This arrangement provides a convenient, compact, bolt-on assembly for providing all of the power means for performing all of the required shifting functions at the transmission location.

According to a further feature of the invention, the first motor means includes a DC electric motor, a speed reduction unit coupled to the output shaft of the DC motor, and lever means interconnecting the output shaft of the speed reduction unit to the free end of the mode select lever. This arrangement provides a convenient and efficient means for delivering the required torque and pivotal movement to the free end of a mode select lever.

According to a further feature of the invention, the lever means interconnecting the output shaft of the speed reduction unit and the mode select lever comprises a first lever connected at one end thereof to the output shaft of the speed reduction unit and a second lever connected at one end thereof to the other end of the first lever and adapted to be connected at its free end to the mode select lever. This arrangement provides an efficient means of transmitting power from the output shaft of the speed reduction unit to the mode select lever, allows the various movement ratios to be readily modified by changing the length of one or more of the levers, and provide a compact envelope essentially lying totally in the plane of the mode select lever.

According to a further feature of the invention, the second lever includes two lever sections selectively movable axially relative to each other to selectively vary the effective length of the second lever. This arrangement allows the second lever to selectively adjust to accommodate manufacturing tolerances.

According to a further feature of the invention, the free end of the second lever includes a snap fitting for snap connection to the free end of the mode select lever. This arrangement simplifies the original vehicle manufacturing process by providing simple and speedy connection as between the supplied power module and the existing transmission hardware.

According to a further feature of the invention, the second motor means is a solenoid arranged to actuate the kick-down lever. The solenoid, in combination with the motor assembly actuating the shift lever, provides positive and convenient control for all of the required shifting movements at the transmission.

According to a further aspect of the invention, the electric shift apparatus comprises first control means accessible to an operator positioned in the passenger compartment of the motor vehicle and operative to generate a plurality of first electrical control signals; second control means accessible to an operator positioned in the passenger compartment of the motor vehicle and operative to generate a second electrical control signal; and a power module adapted to be mounted on the transmission housing proximate the mode select and kick-down levers and operative in response to receipt of the first electrical signals to selectively move the mode select lever and operative to response to receipt of the second electrical signal to selectively move the kick-down lever. This arrangement provides a power module which may be readily mounted on the transmission and which operates in response to receipt of the respective operator initiated signal to perform the required shifting functions at the transmission.

According to a further feature of the invention, the power module includes an electric motor assembly operative in response to receipt of the first electrical signals to selectively move the mode select lever, and a solenoid operative in response to receipt of the second electrical signal to selectively move the kick-down lever. The motor assembly and solenoid operate in combination to effectively and efficiently control the transmission levers.

According to a further feature of the invention, the first control means includes a control module adapted to be mounted in the passenger compartment of the vehicle and including a plurality of mode select members operative to respectively generate the first electrical control signals. This arrangement allows the control of the mode select lever to be provided by simply mounting the power module on the transmission and mounting the control module in the passenger compartment.

According to a further feature of the invention, the second control means includes means operative to generate the second electrical signal in response to total operator depression of the accelerator pedal of the vehicle. This arrangement allows the kickdown lever to be readily actuated in respose to total depression of the accelerator pedal by the operator to generate the required passing torque.

According to a further aspect of the invention, the electric shift apparatus comprises a power module adapted to be mounted on the housing of the transmission proximate the shift lever and including an electric motor assembly adapted to be drivingly connected to the mode select lever and encoder means operative to sense the shift position of the transmission and generate an encoder signal representative of the sensed shift position; a control module adapted to be mounted in the passenger compartment of the vehicle and including a plurality of mode select members accessible to the vehicle operator and corresponding respectively to the transmission shift positions and generator means operative in response to operator actuation of each mode select member to generate an operator signal representative of the selected shift position; and comparator means receiving the encoder signal and the operator signals, operative in response to receipt of an operator signal differing from the received encoder signal to energize the motor assembly in a sense to move the mode select lever to a position corresponding to the operator signal, and operative in response to arrival of the mode select lever in the selected position to de-energize and brake the motor assembly. This arrangement provides a ready and effective means of selectively actuating the motor assembly and insuring that the mode select lever will be moved positively to the shift position selected by the operator.

According to a further feature of the invention, the comparator means forms a physical part of the control module. This arrangement allows the comparator means logic to be incorporated within the control module so that vehicle installation requires only installation of the power module at the transmission and installation of the control module in the passenger compartment.

According to a further feature of the invention, the control module includes a housing structure defining a front face, each of the mode select members comprises a push button mounted in the front face of the housing structure, the generator means operate to generate a respective operator signal in response to depression of a respective push button, and the comparator means are positioned in the housing structure rearwardly of the push buttons. This arrangement provides a convenient and compact package which may be readily mounted in the passenger compartment of the motor vehicle to provide operator push button transmission control and simultaneously provide the comparator logic for coaction with the encoder means to insure that the transmission is moved to the selected position.

According to a further feature of the invention, the motor assembly comprises an electric motor, a speed reduction unit coupled to the output shaft of the motor, and lever means connected at one end thereof to the output shaft of the speed reduction unit and adapted to be connected at the other end thereof to the mode select lever, and the encoder means includes an encoder member mounted on the power module and selectively movable in response to actuation of the motor. This arrangement provides a convenient means for providing an encoder signal for use in determining the instantaneous position of the transmission.

According to a further feature of the invention, the encoder member comprises an encoder wheel mounted on the output shaft of the speed reduction unit. This arrangement provides a convenient means of providing the encoder signal in the context of the existing structure of the motor assembly.

According to a further feature of the invention, the speed reduction unit includes a housing defining a sealed interior chamber, the encoder wheel is positioned within the sealed chamber, and the encoder means further includes a pick-up device carried by the speed reduction unit housing and arranged to selectively engage code indicia on the encoder wheel as the wheel rotates in response to actuation of the motor. This arrangement provides a convenient means of providing the required encoder signal in the protected sealed environment within the existing speed reduction unit.

According to a further feature of the invention, the speed reduction unit includes a worm gear on the output shaft of the motor and a worm wheel on the output shaft of the speed reduction unit driven by the worm gear, and the encoder wheel is secured to a side face of the worm wheel. This arrangement allows the encoder wheel to be conveniently and compactly packaged within the speed reduction unit.

DETAILED DESCRIPTION OF THE PREFERRED EMBODIMENT

Figure 1:
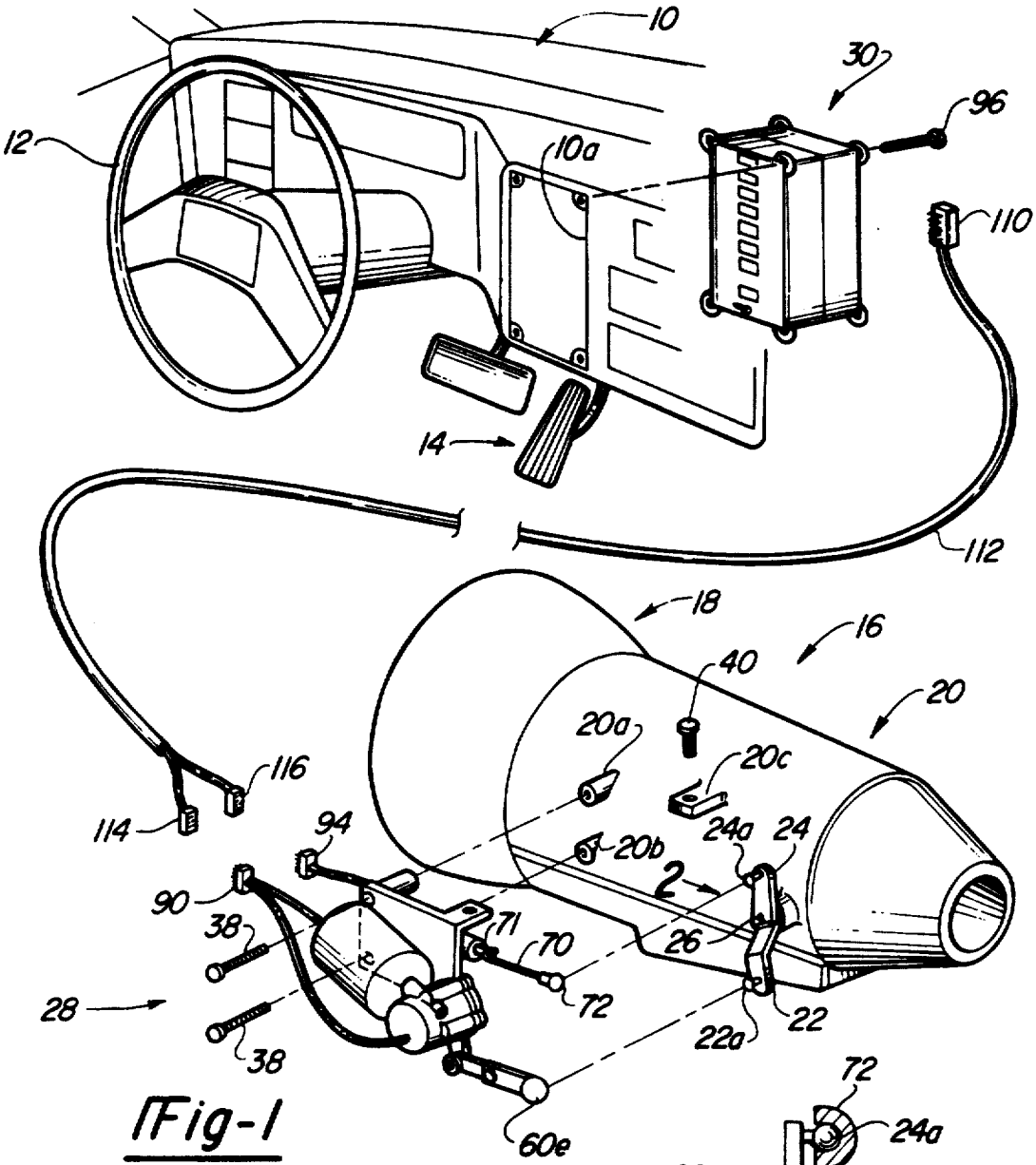
FIG. 1 is a fragmentary perspective view of a motor vehicle embodying the invention electric shift apparatus.
Figure 2:
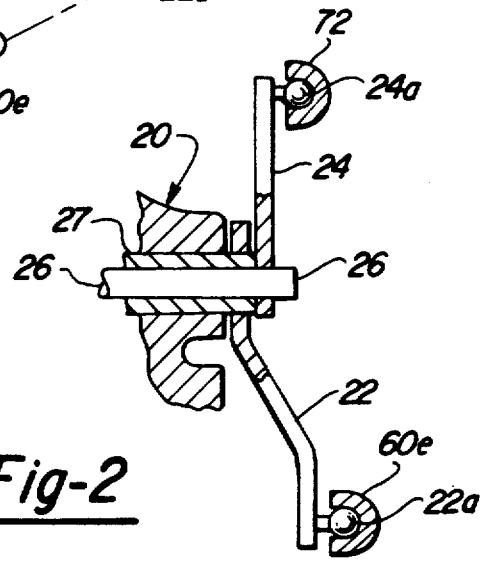
FIG. 2 is a fragmentary view looking in the direction of the arrow 2 in FIG. 1.
Figure 3:
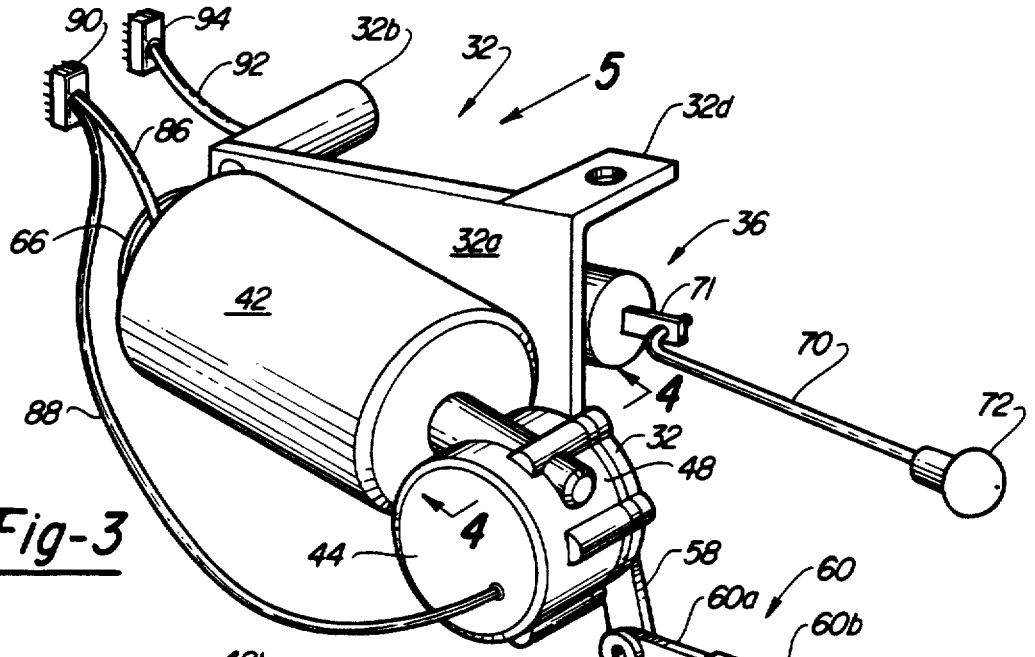
FIG. 3 is a perspective view of a power module employed in the invention electric shift apparatus.
Figure 4:
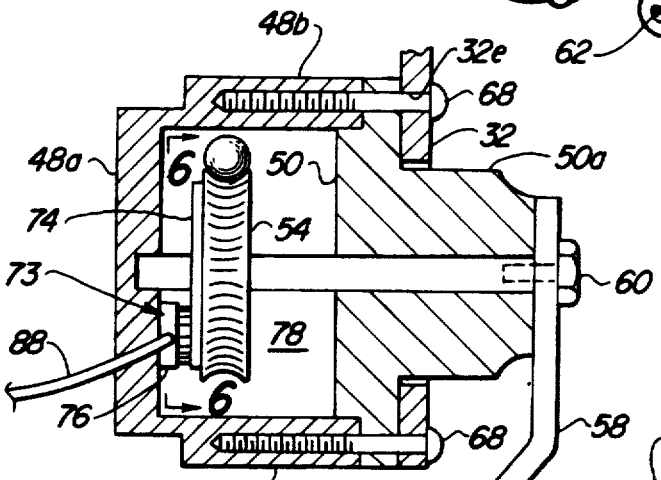
FIG. 4 is a fragmentary cross-sectional view taken on line 4—4 of FIG. 3.
Figure 5:
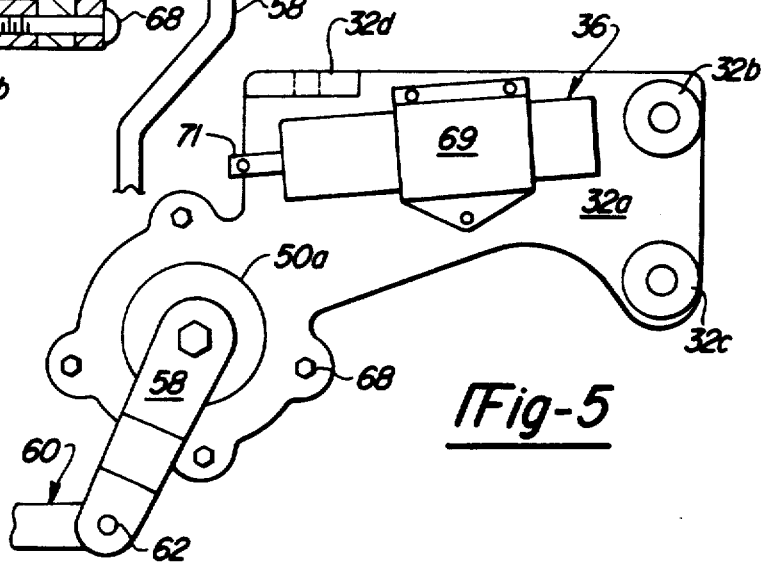
FIG. 5 is a fragmentary view taken in the direction of the arrow 5 in FIG. 3.
Figure 6:
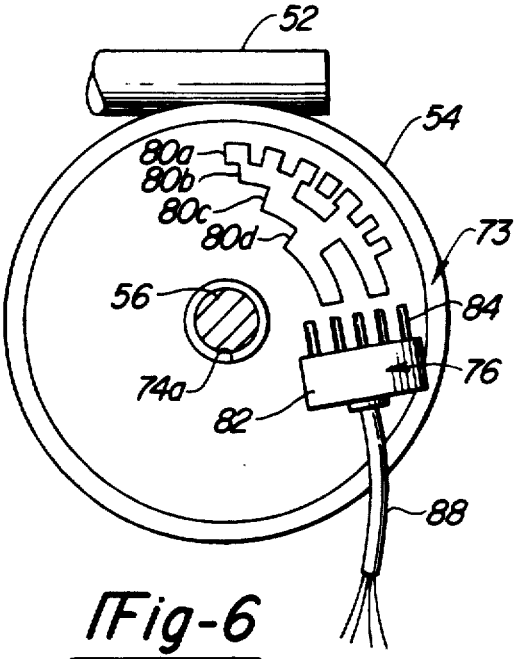
FIG. 6 is a cross-sectional videw taken on line 6—6 of FIG. 4.
Figure 7:
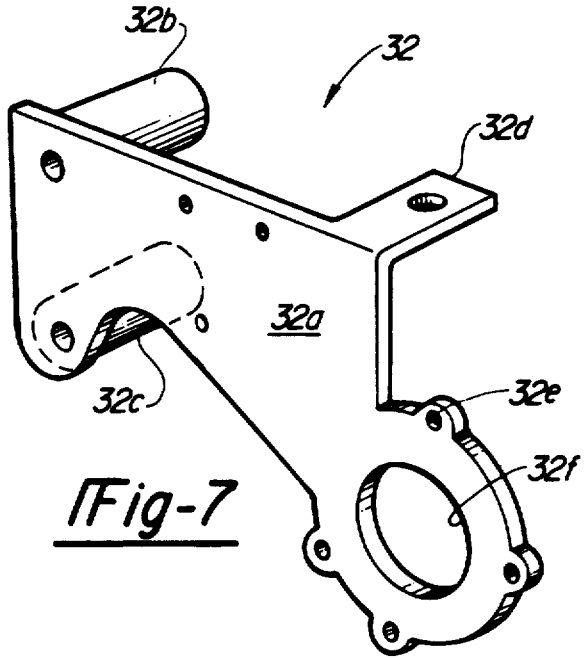
FIG. 7 is a perspective view of a bracket employed in the power module of the invention.
Figure 8:
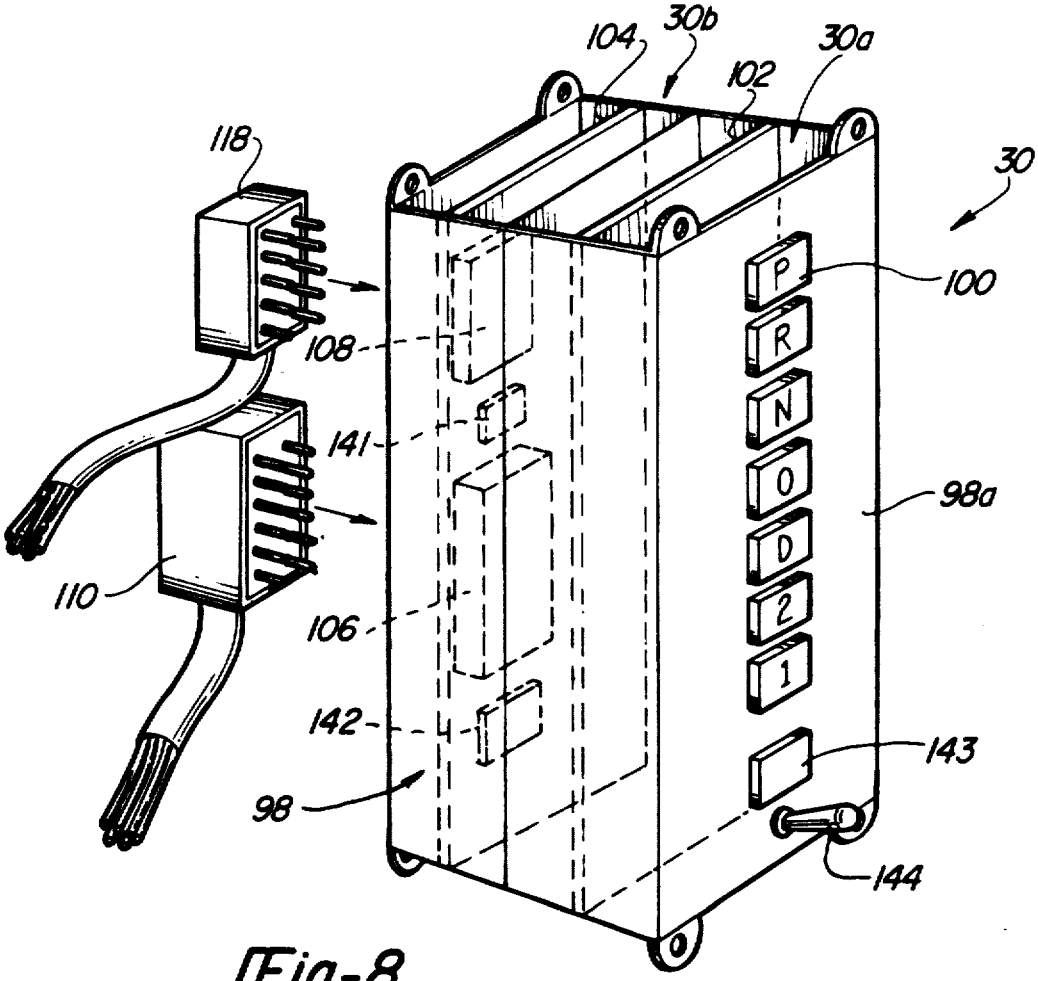
FIG. 8 is a fragmentary perspective view of a control module employed in the electric shift apparatus of the invention.

The invention electric shift apparatus is seen schematically in FIG. 1 in association with a motor vehicle of the type including an instrument panel assembly 10 positioned within the passenger compartment of the motor vehicle; a steering wheel 12 associated with the instrument panel; an accelerator pedal assembly 14; and an automatic transmission assembly 16 including a torque converter 18 and a transmission 20. Transmission 20 includes a mode select *element in the form of a mode select* lever 22 and a kick-down lever 24 each mounted externally of the transmission housing for pivotal movement at one end thereof about a common axis. Specifically, kick-down lever 24 is fixedly mounted at its lower end on a shaft 26 and mode select lever 22 is fixedly mounted at its upper end on a tubular shaft 27 (see FIG. 2) mounted concentrically on shaft 26. It will be understood that selected pivotal movement of mode select lever 22 rotates tubular shaft 27 to operate internal devices within the transmission to position the transmission in a plurality of transmission modes such as park, neutral, drive, et cetera, and that pivotal movement of kick-down lever 24 rotates shaft 26 to operate internal devices within the transmission to shift the transmission to the next lower gear for passing purposes or the like.

The invention electric shift apparatus broadly considered, comprises a power module 28 and a control module 30.

Power module 28 is adapted to be bolted to the transmission in proximity to levers 22 and 24 and includes a bracket 32, a motor assembly 34, and a solenoid 36.

Bracket 32 may be formed as a die casting and includes a planar main body portion 32a, lug portions 32b and 32c and a flange portion 32d. Bracket 32 is readily bolted to the housing of transmission 20 by bolts 38 passing through lugs 32b and 32c for threaded engagement with threaded bosses 20a and 20b on the transmission housing, and by a bolt 40 passing downwardly through an aperture in a flange 32 on the transmission housing for threaded engagement with a lug 20c on the transmission. Bosses 20a and 20b and lug 20c are already present on a typical automatic transmission housing and therefore need not to be especially provided to carry out the invention.

Motor assembly 34 includes a DC electric motor 42, a speed reduction unit 44, and a lever assembly 46.

Motor 42 is direct current and may be example have an output torque rating of 200 inch pounds.

Speed reduction unit 44 is suitably secured to motor 42 and includes a housing 48, a cover plate 50 having central hub member 50a, a worm gear 52 co-axial with the output drive of the motor 42, a worm wheel 54 driven by worm gear 52, and an output shaft 56 driven by worm wheel 54 and journaled in cover plate 50 and in an end wall 48a of housing 48.

Lever assembly 46 includes a first lever 58 secured by a nut 60 to the free end of speed reduction unit output shaft 56, and a second lever 60 secured by pivot means 62 to the free end of lever 58. Lever 60 is a compound member and includes sections 60a and 60b. Section 60b telescopically receives section 60a with a pin 60c carried by section 60a guiding in a slot 60d in section 60b to allow the two sections to move axially relative to each other to vary the effective length of lever 60. The two sections may be locked in any selected position of adjustment by a nut 63 carried by pin 60c. The free end of lever 60 comprises a plastic snap fitting 60e for snapping engagement with a ball fitting 22a on the free end of mode select lever 22.

Figure 13:
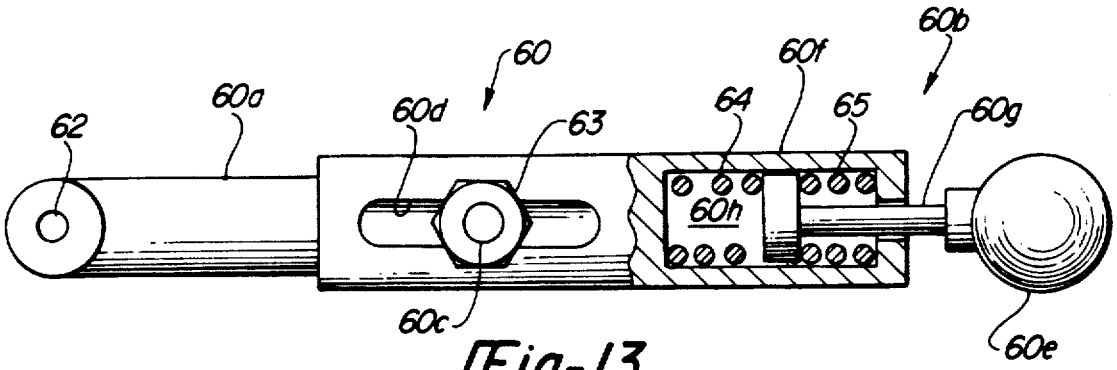
FIG. 13 is a view of a modified lever assembly for use in the invention electric shift apparatus.

A modified version of compound lever 60 is shown in FIG. 13. In the arrangement of FIG. 13, lever section 60b of compound lever 60 is itself a compound member including a first member 60f and a second member 60g. Member 60f is connected by slot 60d and pin 60c to lever section 60a and defines a central cavity 60h. Member 60g carries snap fitting 60e at its free end and is slidably received at its other end in cavity 60h with a pair of matched coil springs 64,65 positioned in cavity 60h and engaging opposite sides of a piston member 60i mounted on member 60g in cavity 60h.

The motor assembly 34 is mounted on the outboard face of the planar main body portion 32a of bracket 32. Specifically, motor 42 is mounted to the outboard face of bracket portion 32a by a bracket 66 and speed reduction unit 44 is mounted to the outboard face of bracket portion 32a by a plurality of circumferentially spaced bolts 68 passing through apertures 32e in bracket 32 and through suitable apertures in speed reduction unit cover plate 50 for engagement with threaded bosses 48b spaced circumferentially about housing 48. In assembled relation, the hub portion 50a of cover plate 50 passes through apertures 32f in bracket 32 to position lever 58 on the inboard face of the bracket.

Solenoid 36 may comprise for example a pull type unit capable of generating three pounds of pull and having a stroke of between three-eighths and one-half inch. Solenoid 36 is secured to the inboard face of planar main body portion 32a of bracket 32 by a clamp 69. A cable 70 is secured to the plunger 71 of the solenoid and a plastic snap fitting 72 is secured to the free end of cable 70.

Power module 28 further includes an encoder assembly 73 operative to sense the shift position of the transmission and generate an encoded signal representative of the sensed shift position.

Encoder assembly 73 include an encoder wheel 74 and a pick-up device 76. Encoder wheel 74 may be formed for example of a suitable plastic material and is positioned on a side face of worm wheel 54 within the closed and sealed interior chamber 78 defined by housing 48 and cover plate 50. Encoder wheel 74 includes a central aperture 74a passing speed reduction unit output shaft 56 and further includes code indicia 80 provided on the exposed outer face of the wheel and arranged along four arcuate tracks 80a, 80b, 80c and 80d centered on the center line of the encoder wheel.

Pick-up device 76 includes a body member 82 mounting a plurality of flexible resilient contact fingers 84 for respective coaction with indicia tracks 80a, 80b, 80c and 80d. In addition to the four fingers 84 for respective engagement with the four indicia tracks, a fifth finger is provided to provide a ground for the system.

A lead 86 from motor 42 and a lead 88 from pick-up device 76 are combined into a pin-type plug 90 and a lead 92 from solenoid 36 terminates in a pin-type plug 94.

Control module 30 is intended for ready installation in an opening 10a in instrument panel 10 by insertion of the module from the rear of the housing and fastening of the module within opening 10a by the use of several fasteners such as seen at 96. Module 30 includes a housing structure 98 of general box-like configuration enclosing an operator access or push button submodule 30a and a logic submodule 30b.

Push button submodule 30a includes a plurality of *mode select members in the form of* push buttons 100 positioned in vertically spaced relation in the front face 98a of the module housing and corresponsding to the available transmission shift modes. Specifically, buttons 100 include buttons corresponding to park, reverse, neutral, over-drive, drive, second and first shift positions for the transmission. Buttons 100 coact in known manner with a printed circuit board 102 to generate suitable electrical signals in response to respective depression of the buttons 100.

Logic submodule 30b include an electronic printed circuit board 104 suitably electrically connected to printed circuit 102 and suitably mounting a first plurality of connector terminals 106 and a second plurality of connector terminals 108. Connector terminals 106 coact with a pin-type plug 110 at the end of a cable 112. Cable 112 includes plugs 114 and 116 at its remote end for plugging receipt of plugs 90 and 94 so that plug 110 embodies the information from leads 86, 88 and 92. Connector terminals 108 coact with a pin-type plug 118. Plug 118 embodies the information from leads 120, 121, 122, 123, 124, 125 and 126.

Lead 120 is associated with a switch 130 sensing the open or closed position of the driver's door of the vehicle; lead 121 is associated with a switch 132 sensing the presence or absence of a driver on the driver's seat of the vehicle; lead 122 senses the open or closed condition of the ignition switch 134 of the vehicle; leads 123 and 124 are connected to the negative and positive terminals of the vehicle battery 135 with a suitable fuse 136 in lead 123; lead 125 is connected to a speed sensor 137 which provides information with respect to the instantaneous speed which the vehicle is traveling; and lead 126 is connected with a switch 138 which is closed in response to movement of throttle lever 139 to its extreme open throttle position by a cable 140 connected to known manner to the accelerator assembly 14 of the vehicle.

The invention electric shift assembly is delivered to the vehicle manufacturer in the form of power module 28 and control module 30. During the assembly of the vehicle, the power module 28 is mounted on the transmission housing proximate the control levers 24 and 26 and the control module 30 is mounted in the instrument panel 10, whereafter plugs 90 and 94 are plugged into plugs 114 and 116 and plugs 110 and 118 are plugged into control module 30 to complete the assembly of the invention electric shift apparatus.

The mounting of power module 28 on the transmission housing is accomplished simply by passing bolts 38 through bosses 32b and 32c for threaded engagement with transmission housing bosses 20a and 20b, passing bolt 40 through lug 32d for threaded engagement with transmission housing lug 20c, and snapping snap fittings 60e and 72 respectively over ball fitting 22a on the free end of mode select lever 22 and a ball fitting 24a on the free end of kick-down lever 24. As the lever assembly 46 is connected to the mode select lever, lever sections 60a and 60b of lever 60 move telescopically and selectively relative to each other to provide the precise effective length of length 60 to allow positive snapping engagement of snap fitting 60e over ball 22a irrespective of manufacturing tolerances, whereafter nut 64 is tightened to lock the lever 60 in its precise adjusted position.

Installation of control module 30 in instrument panel 10 is affected simply by moving the control module from the rear of the panel into the opening 10a and fastening the module in place by the use of fasteners 96 or the like. Following the plugging of plugs 90 and 94 into plugs 114 and 116 and the plugging of plugs 110 and 118 into connector terminals 106 and 108, the system is operational and ready for use.

Figure 14:
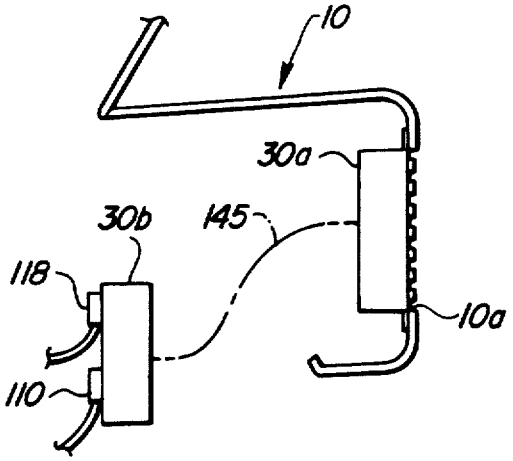
FIG. 14 is a view of a modified system for mounting the invention control module in the vehicle.

Alternatively, in situations where space immediately behind the facia of the instrument panel is limited, submodules 30a and 30b may be designed and delivered as separate units with push button submodule 30a mounted as previously described in opening 10a of the instrument panel and logic submodule 30b mounted elsewhere in the general environment of the instrument panel and connected to push button submodule 30a in known manner by suitable wiring. For example, as seen in FIG. 14, push button submodule 30a may be mounted in instrument panel opening 10a and logic submodule 30b may be mounted in the general area behind and below the facia of the instrument panel 10 with the submodules interconnected by wiring seen generally at 145.

Figure 9:
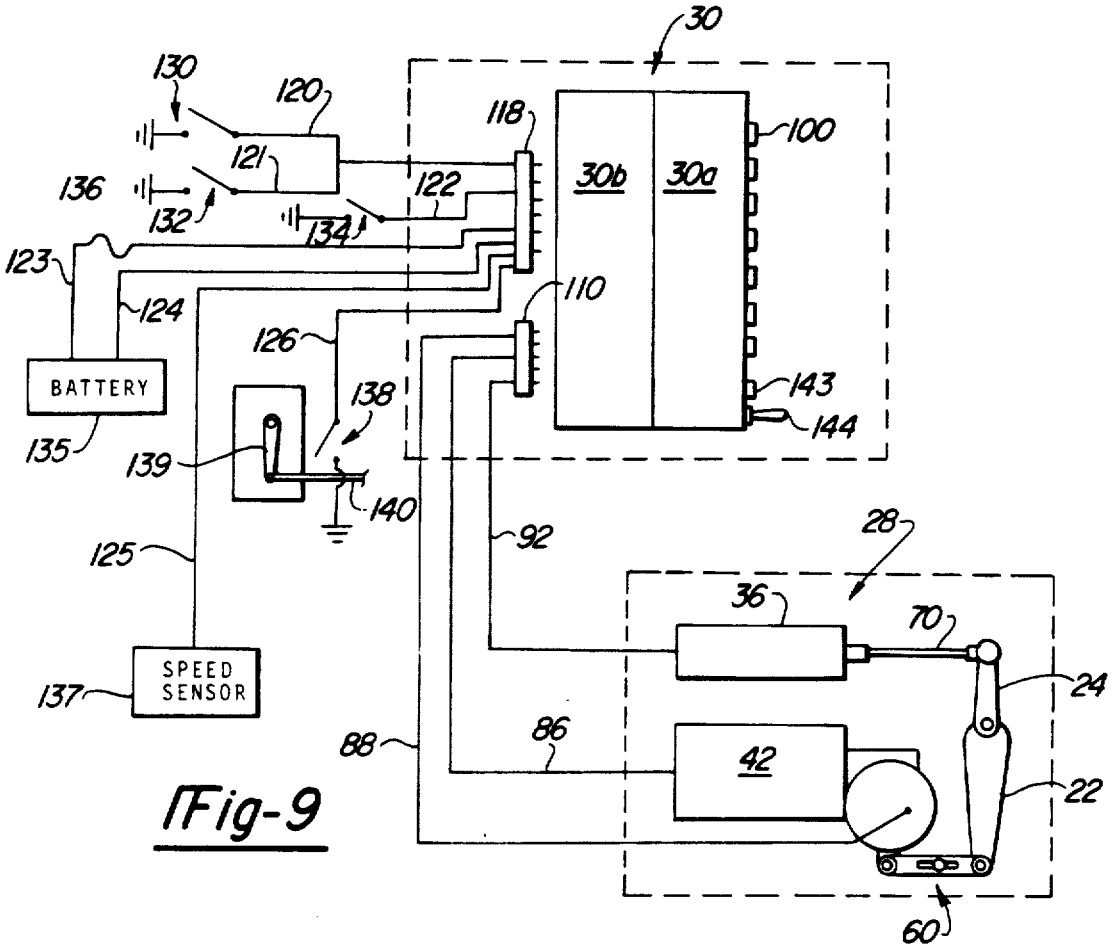
FIG. 9 is a circuit diagram for the invention electric shift apparatus.

In use various input signals, such as described above and illustrated in FIG. 9, are supplied to logic chip 141, which may be a programmable logic array or a gate array. Logic chip 141 is configured to receive these input signals and generate the necessary drive signals to motor 42 and solenoid 36 via buffer 142 for providing the selection of the desired gear. Firstly, the various input signals are formed into a set of logic signals. These logic signals include a set of signals whose state is selected by the depressed push button 100; PARK, RVRS, NTRL, OVDR, DRVE, LOW1 and LOW2. One of these signals, corresponding to the desired gear selected by the depressed push button is a logic "1" while the other of these signals are a logic "0". Similarly the encoder signal from encoder assembly 72 permits generation of a set of logic signals PGP, PGR, PGN, PGO, PGD, PGL1 and PGL2 one of which is active to indicate the present gear and the others of which are inactive. The speed sensor input signal is formed into four logic signals: MPH3 indicating a speed of greater than or equal to 3 miles per hour; MPH7 indicating a speed of greater than or equal to 7 miles per hour; MPH20 indicating a speed of greater than or equal to 20 miles per hour; and MPH30 indicating a speed of greater than or equal to 30 miles per hour. Each of these signals is active if their condition is satisfied and inactive if not. Note that these signals are cumulative; if the speed is over 30 miles per hour then all will be active. Additional logic signals include DOOR indicating the opened/closed status of the driver's door, SEAT indicating whether or not the driver's seat is occupied, IGN indicating the status of the ignition switch and ACC indicating whether or not the accelerator switch 138 is closed.

Logic chip 141 serves to compare the inputs indicating the depressed push button with the inputs indicating the present gear. If they differ, then logic chip 141 generates an output signal to motor 42 to rotate the motor unit the present gear matches the selected gear. This process includes an indication of which shifts are upshifts and which are down shifts according to the following Boolean equations:

UP1 = PGL1
UP2 = PGL2 and Not(LOW1)
UP3 = PDD and (Not(LOW2) and Not(LOW1))
UP4 = PGO and (NRTL or RVRS or PARK)

UP5=PGN and (RVRS or PARK)
UP6=PGR and PARK
UPSHFT=UP1 or UP2 or UP3 or UP4 or UP5 or UP6
DNSHFT=Not(Not(UP1) and Not(UP2) and Not-(UP3) and Not(UP4) and Not(UP5) and Not(UP6))

Thus an up shift is required if the present gear is low1 (UP1), or the present gear is low2 and low1 is not requested (UP2), or the present gear is drive and neither low1 nor low2 are requested (UP3), or the present gear is overdrive and either neutral, reverse or park is selected (UP4), or the present gear is neutral and either reverse or park is selected (UP5), or the present gear is reverse and park is selected. A down shift is requested if none of the intermediate states are satisfied.

Two motor control signals SHFTUP and SHFTDN are generated when the signals ENABLE and OK2SHFT are active and the respective UPSHFT or DNSHFT is active and shown below.

SHFTUP=ENABLE and UPSHFT
SHFTDN=ENABLE and DNSHFT

The ENABLE signal generally requires the desired gear to differ from the present gear and certain safety conditions to be satisfied. As shown below, ENABLE is inactive when the desired gear is the same as the present gear.

ENABLE=GOLOW1 or GOLOW2 or GODRVE or GOOVDR or GONTRL or GORVRS or GO-PARK

These intermediate signals are formed as follows:

GOLOW1=LOW1 and Not(PGL1) and Not(MPH30)
GOLOW2=LOW2 and Not(PGL2) and Not(MPH20)
GODRVE=DRVE and Not(PGD)
GOOVDR=OVDR and Not(PGO)
GONTRL=NTRL and Not(PGN)
GORVRS=RVRS and Not(PGR) and Not(MPH7)
GOPARK=(PARK and Not(PGP) and Not(MPH3)) or (((Not(IGN) or (Not(DOOR) and Not(SEAT))) and Not(PGN) and Not(MPH3)))

Thus the logic chip 141 does not permit a shift into low1 when the speed is in excess of 30 miles per hour, and likewise does not permit a shift to low2 if in excess of 20 miles per hour, to reverse if in excess of 7 miles per hour, and to park if in excess of 3 miles per hour. The second term in GOPARK automatically shifts to park if the ignition is switched off (Not(IGN)), or if the door is opened (Not(DOOR)) and the seat is empty (Not(-SEAT)), the driver's seat empty and the speed is not greater than 3 miles per hour.

As soon as the instantaneous encoder signal transmitted by pick-up device 76 matches the signal generated by the specific depressed push button, the comparator logic of control module 10 functions to deenergize and brake the motor so that the module select lever 22, and thereby the transmission, is stopped precisely in the selected shift position. If the lever 60 construction of FIG. 13 is employed, springs 64,65 coact with piston 60i to ensure that the internal detent controlled by lever 22 does not hang up on a crest of the known roostertail in the transmission but that, rather, the detent is moved to a precise shift position in which it is firmly seated in a notch or valley of the roostertail.

If at any time the operator desires to downshift the transmission as, for example, in a passing situation, the accelerator pedal 14 is fully depressed to close switch 138. A signal from the closed switch 138 is transmitted to control module 30 by lead 126 where it is amplified by a buffer device 142 carried by printed circuit 104 and transmitted in amplified form through lead 92 to solenoid 36 which is thereby energized to retract the plunger of the solenoid and pivot downshift lever 24 in a counter-clockwise direction, as viewed in FIG. 9, to effect the desired downshifting of the transmission.

The invention system would also preferably include illumination means for the push buttons 100 with the intensity of the illumination controlled by the usual dash dimmer and with the button corresponding to the selected gear being illuminated brighter than the remaining buttons to provide a ready indication of the instantaneous position of the transmission. An override push button 143 is also provided as a part of push button submodule 30a. Over-ride push button 143 allows the selection of the neutral shift position when it is necessary for the seat to be empty and the vehicle to be in neutral, for example, during vehicle tune-up, vehicle car wash, et cetera.

The system also preferably includes a limp home switch 144 as part of the push button submodule 30a. Limp home switch 144 is arranged to manually jog motor 42 in the event of a system malfunction to enable the vehicle to be driven home or to a repair facility.

Figure 10:
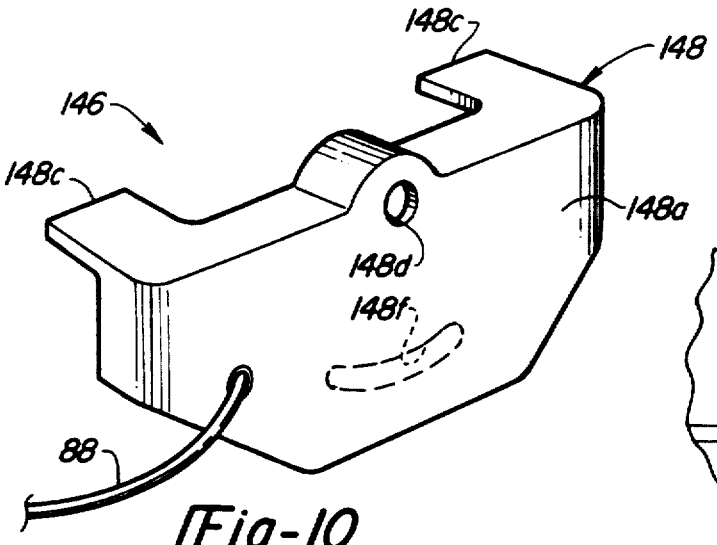
FIGS. 10, 11 and 12 are views of an alternate form of encoder mechanism for use in the invention electric shift apparatus.
Figure 11:
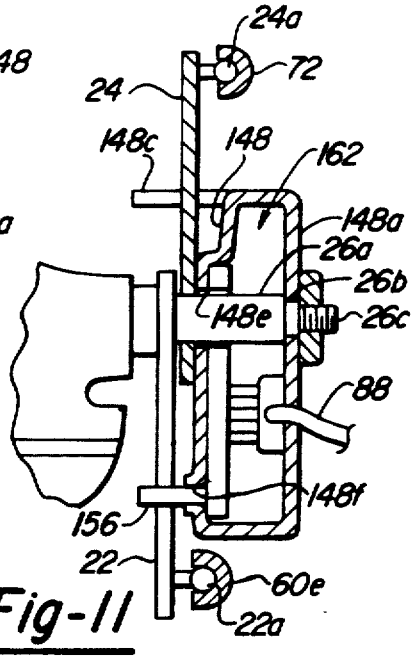
Figure 12:
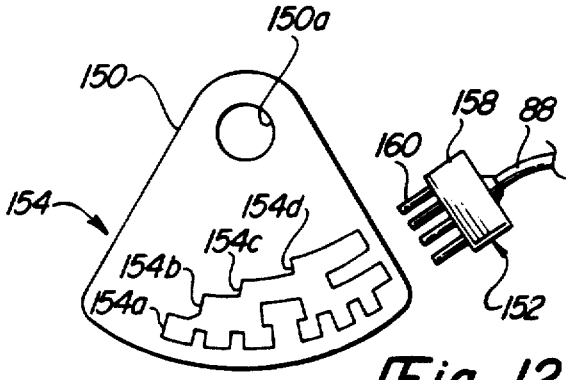

An alternate form of encoder assembly is shown in FIGS. 10-12. In this arrangement, the encoder assembly, rather than being provided within the sealed cavity 78 of the speed reduction unit 44, is provided as an independent unit 146 adapted to be fitted over the mode select lever 22 and to move with that lever so as to constantly sense the position of that lever and thereby sense the shift position of the transmission.

Encoder assembly 146 includes a housing 148, an encoder member 150, and a pick-up device 152.

Housing 148 may be formed of any suitable rigid material and includes an outer wall 148a, an inner wall 148b, flange portions 148c, an aperture 148d in outer wall 148a, an aperture 148e in inner wall 148b, and an arcuate slot 148f in inner wall 148b. In this embodiment, the central shaft 26 on which the kick-down lever 24 is mounted is extended to provide a shank portion 26a, shoulder portion 26b, and a threaded end portion 26c.

Encoder member 150 is arcuate and includes coded indicia 154 provided on tracks 154a, 154b, 154c and 154d generally corresponding to tracks 80a, 80b, 80c and 80d on encoder wheel 74. Pins 156 project from the face of encoder member 150 opposite the face on which indicia 154 is provided.

Pick-up device 152 includes a body portion 158 and resilient fingers 160 for coaction with the coded indicia on encoder member 150.

Encoder member 150 is positioned within the hollow interior 162 of housing 148 with pins 156 passing sealingly through arcuate slot 148f, and pick-up device 152 is positioned on the inner face of outer housing wall 148a with fingers 160 in coating relation to the coded indicia on encoder member 150.

Encoder assembly 146 is fitted over shaft 26 with housing aperture 148e positioned on shank portion 26a, aperture 150a of encoder member 150 positioned on shank 26a, outer wall 148a positioned on shoulder 26b, and a nut 164 engaging threaded end portion 26c and seating against the annular shoulder between shaft portions 26b and 26c so as to preclude axial displacement of encoder assembly 146 relative to shaft 26 but allow rotation of the shaft relative to encoder assembly 146. Rotation of the encoder assembly is prevented by engagement of flange portions 148c with suitable portions on the transmission housing with kick down lever 24 disposed between spaced flanged portions 148c and pivotal in the space provided between the flange portions. Pins 156 snuggly engage the opposite side edges of mode select lever 22 so that encoder member 150 moves positively and precisely in accordance with the movement of the mode select lever and so that the encoder signal picked up, generated and transmitted by pick-up device 152 from the coded indicia on encoder member 150 is always representative of the precise shift position of the transmission.

The invention electric shift apparatus will be seen to have many advantages. Specifically, the two modular assemblies minimize component and inventory requirements; the ease of assembly of the modules minimizes assembly plant labor; the power and control modules may both be pretested prior to delivery to the vehicle manufacturer with consequent improvements in reliability and warranty costs; noise and vibration from the power train to the passenger compartment is substantially minimized; the awkward and intruding gear select lever is eliminated in favor of attractive flush-mounted push buttons in the instrument panel of the vehicle; and several important safety and convenience features are provided such as automatic shifting to park when the ignition is shut off; automatic prohibition of shifts that would be inappropriate in view of the sensed vehicle speed and direction, and automatic movement of the transmission to park in the event that the driver opens the door and leaves the seat with the engine running and the transmission in a position other than park. The invention electric shift apparatus thus provides many comfort, convenience, and safety advantages as compared to existing transmission control systems and yet may be provided at a cost that is competitive with the existing systems and with projected maintenance and warranty costs less than the existing systems.

Whereas preferred embodiments of the invention have been illustrated and described in detail it will be apparent that various changes have been made in the disclosed embodiments not departing from the scope or spirit of the invention.

We claim:

1. An electric shift apparatus for use with a motor vehicle having an automatic transmission of the type including a mode select lever and a kick-down lever positioned outside of the transmission housing and mounted for pivotal movement at one end thereof about a common axis, said apparatus comprising:

(A) a bracket adapted to be secured to said transmission housing proximate said levers;

(B) first motor means mounted on said bracket and adapted to be drivingly connected to the free end of the mode select lever; and (C) second motor means mounted on said bracket and adapted to be drivingly connected to the free end of the kick-down lever.

2. An electric shift apparatus according to claim 1 wherein:

(D) said first motor means is an electric motor assembly.

3. An electric shift apparatus according to claim 2 wherein:

(E) said electric motor assembly includes a DC motor, a speed reduction unit coupled to the output shaft of said DC motor, and lever means interconnecting the output shaft of said speed reduction unit to the free end of the mode select lever.

4. An electric shift apparatus according to claim 3 wherein:

(F) said lever means comprises a first lever connected at one end thereof to said output shaft of said speed reduction unit and a second lever connected at one end thereof to the other end of said first lever and adapted to be connected at its free end to the mode select lever.

5. An electric shift apparatus according to claim 4 wherein:

(G) said second lever includes two lever sections selectively movable axially relative to each other to selectively vary the effective length of said second lever.

6. An electric shift apparatus according to claim 4 wherein:

(G) said free end of said second lever includes a snap fitting for a snap connection to the free end of the mode select lever.

7. An electric shift apparatus according to claim 2 wherein:

(E) said second motor means is a solenoid.

8. An electric shift apparatus according to claim 7 wherein:

(F) said bracket is adapted to be positioned generally vertically at one side of the transmission housing in laterally spaced relation to the transmission housing;

(G) said solenoid is mounted on the inboard side of said bracket so as to be positioned between said bracket and said transmission housing; and (H) said motor assembly is mounted on the outboard side of said bracket.

9. An electric shift apparatus according to claim 8 wherein:

(I) said motor assembly includes a DC motor, a speed reduction unit coupled to the output shaft of said DC motor, and lever means interconnecting the output shaft of said speed reduction unit and the free end of the mode select lever.

10. An electric shaft apparatus according to claim 9 wherein:

(J) said DC motor is positioned on the outboard side of said bracket;

(K) said speed reduction unit is positioned on the outboard side of said bracket with its output shaft extending inboard to the inboard side of said bracket; and (L) said lever means is connected at one end thereof to said speed reducer output shaft at the inboard side of said bracket.

11. An electric shift apparatus according to claim 10 wherein:

(M) said lever means comprises a first lever connected at one end thereof to said output shaft of said speed reduction unit and a second lever connected at one end thereof to the other end of said first lever and adapted to be connected at its free end to the mode select lever.

12. An electric shift apparatus according to claim 10 wherein said second lever includes two lever sections selectively movable axially relative to each other to vary the effective length of said second lever.

13. An electric shift apparatus according to claim 12 wherein:

(O) said free end of said second lever includes a snap fitting for snap connection to the free end of the mode select lever.

14. An electric shift apparatus for use with a motor vehicle having an automatic transmission of the type including a mode select lever and a kick down lever positioned on but outside of the transmission housing and mounted for pivotal movement at one end thereof about a common axis, said apparatus comprising:

(A) first control means accessible to an operator positioned in the passenger compartment of the motor vehicle and operative to generate a plurality of first electrical control signals;

(B) second control means accessible to an operator positioned in the passenger compartment of the motor vehicle and operative to generate a second electric control signal; and (C) a power module adapted to be mounted on said transmission housing proximate said levers and operative in response to receipt of said first electrical signals to selectively move said mode select lever and operative in response to receipt of said second electrical signal to selectively move said kick-down lever.

15. An electric shift apparatus according to claim 14 wherein:

(E) said power module includes an electric motor assembly operative in response to receipt of said first electrical signals to selectively move said mode select lever and a solenoid operative in response to receipt of said second electrical signal to selectively move said kick-down lever.

16. An apparatus according to claim 15 wherein:

(F) said first control means includes a control module adapted to be mounted in the passenger compartment of the vehicle and including a plurality of mode select members operative to respectively generate said first electrical control signals.

17. An apparatus according to claim 16 wherein:

(G) said second control means includes means operative to generate said second electrical signal in response to total operator depression of the accelerator pedal of the vehicle.

18. An electric shift apparatus for use with a motor vehicle having an automatic transmission of the type including a mode select [lever] *element* to selectively shift the transmission between a plurality of shift positions, said apparatus comprising:

(A) a power module adapted to be mounted on the housing of the transmission proximate the mode select [lever] *element* and including an electric motor assembly adapted to be drivingly connected to the mode select [lever] *element* and encoder means operative to sense the shift position of the transmission and generate an encoder signal representative of the sensed shift position;

(B) a control module adapted to be mounted in the passenger compartment of the vehicle and including a plurality of mode select members accessible to the vehicle operator and corresponding respectively to the transmission shift positions, and generator means operative in response to operator actuation of each mode select member to generate an operator signal representative of the selected shift position; and (C) comparator means receiving said encoder signal and said operator signals, operative in response to receipt of an operator signal differing from the received encoder signal to energize said motor assembly in a sense to move the mode select [lever] *element* to a position corresponding to the operator signal, and operative in response to arrival of the mode select [lever] *element* in the selected position to de-energize and brake said motor assembly.

19. An electric shift apparatus according to claim 18 wherein:

(D) said comparator means forms a physical part of said control module.

20. An apparatus according to claim 19 wherein:

(E) said module includes a housing structure defining a front face;

(F) each of said mode select members comprises a push button mounted in said front face of said housing structure;

(G) said generator means is operative to generate a respective operator signal in response to depression of a respective push button; and (H) said comparator means are positioned in said housing structure rearwardly of said push buttons.

21. An apparatus according to claim 18 wherein (D) said motor assembly comprises an electric motor, a speed reduction unit coupled to the output shaft of said motor, and lever means connected at one end thereof to the output shaft of said speed reduction unit and adapted to be connected at the other end thereof to said mode select [lever; ] *element* and (E) said encoder means includes an encoder member mounted on said power module and selectively movable in response to actuation of said motor.

22. An apparatus according to claim 21 wherein:

(F) said encoder member comprises an encoder wheel mounted on said output shaft of said speed reduction unit.

23. An apparatus according to claim 22 wherein (G) said speed reduction unit includes a housing defining a sealed, interior chamber;

(H) said encoder wheel is positioned within said chamber; and (I) said encoder means further includes a pick-up device carried by said speed reduction unit housing and arranged to selectively engage code indicia on said encoder wheel as said wheel rotates in response to actuation of said motor.

24. An apparatus according to claim 23 wherein:

(J) said speed reduction unit includes a worm gear on the output shaft of said motor and a worm wheel on the output shaft of the speed reduction unit driven by said worm gear; and (K) said encoder wheel is secured to a side face of said worm wheel.

25. An electric shift apparatus according to claim 18 wherein:

(D) said control module comprises an operator access submodule adapted to be mounted in an opening in the instrument panel of the vehicle; and (E) said comparator means comprises a logic submodule adapted to be mounted in the passenger compartment of the vehicle remote from, but electrically interconnected to, the operator access submodule.

26. An electric shift apparatus according to claim 25 wherein:

(F) said mode select member is comprised of push buttons mounted in the front face of said operator access submodule.

* * * * *